United States Patent [19]

Rudy et al.

[11] Patent Number: 5,047,382

[45] Date of Patent: Sep. 10, 1991

[54] METHOD FOR MAKING IRON OXIDE CATALYST

[75] Inventors: Thomas P. Rudy, Saratoga; Forrest R. Goodson, San Jose, both of Calif.

[73] Assignee: United Technologies Corporation, Hartford, Conn.

[21] Appl. No.: 283,117

[22] Filed: Dec. 12, 1988

[51] Int. Cl.$^5$ ............................................. B01J 23/74
[52] U.S. Cl. ................................................... 502/338
[58] Field of Search ............... 502/325, 338; 423/634, 423/633, 417; 106/456; 149/109.2, 109.6, 110, 20, 2, 21

[56] References Cited

U.S. PATENT DOCUMENTS

| | | | |
|---|---|---|---|
| 2,565,977 | 8/1951 | Adams et al. | 252/474 |
| 2,772,956 | 12/1956 | West et al. | 75/0.5 |
| 2,851,347 | 9/1958 | Schlecht et al. | 75/0.5 |
| 2,900,245 | 8/1959 | Beller | 75/0.5 |
| 2,938,781 | 5/1960 | Schmeckenbecher | 75/0.5 |
| 3,361,531 | 1/1968 | Erb et al. | 423/633 |
| 3,390,979 | 3/1976 | Callighan et al. | 252/455 R |
| 3,677,839 | 7/1972 | Sayles | 149/19 |
| 3,864,463 | 2/1975 | Chao | 423/633 |
| 3,932,242 | 1/1976 | Bartley et al. | 149/19.9 |
| 4,003,850 | 1/1977 | Callighan et al. | 502/74 |
| 4,006,090 | 2/1977 | Beck | 252/62.56 |
| 4,023,994 | 5/1977 | Arendale | 149/19.2 |
| 4,057,441 | 11/1977 | Biddle | 149/19.9 |
| 4,073,874 | 2/1978 | Fukushima | 423/633 |
| 4,108,696 | 8/1978 | Ashmore et al. | 149/19.2 |
| 4,120,709 | 10/1978 | Hamner et al. | 149/19.92 |
| 4,145,301 | 3/1979 | Bruylants et al. | 423/633 |
| 4,424,085 | 1/1984 | Fukuma et al. | 149/19.1 |
| 4,608,239 | 8/1986 | Devon | 423/210 |
| 4,652,305 | 3/1987 | Ebenhoech et al. | 75/0.5 |
| 4,655,860 | 4/1987 | Sayles | 149/19.92 |
| 4,826,671 | 5/1989 | Arndt et al. | 423/633 |
| 4,854,981 | 8/1989 | Goodson et al. | 149/76 |
| 4,881,994 | 11/1989 | Rudy et al. | 149/109.4 |

FOREIGN PATENT DOCUMENTS

| | | |
|---|---|---|
| 0256529 | 2/1988 | European Pat. Off. . |
| 0289442 | 11/1988 | European Pat. Off. . |
| 2084406 | 12/1971 | France . |

OTHER PUBLICATIONS

"Flame Synthesis of Fine Particles", by Gael D. Ulrich, Aug. 6, 1984, C&EN, pp. 22-29.

"Particle Growth in Flames—III, Coalescence as a Rate-Controlling Process", G. D. Ulrich & N. S. Subramanian, Combustion Science & Technology, 1977, vol. 17.

"Theory of Particle Formation & Growth in Oxide Synthesis Flames", G. D. Ulrich, Combustion Science & Technology, 1971, vol. 4, pp. 45-57.

"Aggregation & Growth of Submicron Oxide Particles in Flames", G. D. Ulrich, Journal of Colloid & Interface Science, vol. 87, No. 1, May 1982, pp. 257-265.

Chart—Mapico Iron Oxides (Cities Service, Columbian Division Citco), pp. 119-126.

*Primary Examiner*—W. J. Shine

[57] ABSTRACT

A method for making a ferric oxide burning rate enhancing catalyst that results in a smaller particle size high surface area catalyst. The method comprises diluting a gaseous iron-containing compound with an oxygen-containing gas at a temperature such that the rate of oxidation is negligible and oxidizing the diluted gaseous iron-containing compound in an oxygen-containing environment. Ferric oxide particles are formed, suspended in the oxygen-containing environment.

14 Claims, 6 Drawing Sheets

300,000 X 300,000 X 300,000 X 300,000 X 5,047,382

METHOD FOR MAKING IRON OXIDE CATALYST

CROSS REFERENCE

This application relates to commonly assigned copending applications Ser. No. 44,096 filed Apr. 30, 1987, now U.S. Pat. No. 4,854,981, entitled "Iron Oxide Catalyst and Method for Making Same" and Ser. No. 44,097 filed Apr. 30, 1987, now U.S. Pat. No. 4,881,994, entitled "Iron Oxide Catalyst and Method for Making Same" which disclose material related to that contained herein, the disclosures of which are hereby incorporated by reference.

TECHNICAL FIELD

This invention relates to a method for making an iron oxide catalyst.

BACKGROUND ART

In the field of composite solid propellants for various rocket motors, a continuing desire is to increase the burning rate. An increase in the burning rate of a solid propellant leads to an increase in the mass flux of combustion gases, hence an increase in thrust. Accordingly, it becomes possible to increase the launching velocity of the rocket or, when there is no need of increasing the launching velocity, to reduce the burning surface area. In the latter case, the loading efficiency (mass fraction of propellant) may be increased. Thus, solid propellants of increased burning rates are the basis of solid propellant rocket motors of relatively small size but relatively high thrust and also will certainly contribute to broadening of the applicability of end-burning rocket motors.

Typically, the burning rate of a composite solid propellant is increased with minimum effect on other properties by using an additive that catalyzes the reaction between the oxidizer and the binder (fuel) in the propellant. Until now, various metal oxide powders have been proposed as the burning rate increasing additive or catalyst, but most of them have proved to be impractical because they promote degradation of conventional rubber binders. The most useful binders contain a substantial concentration of polybutadiene, an unsaturated hydrocarbon that provides elasticity. The olefinic unsaturation is very vulnerable to attack by atmospheric oxygen, particularly when catalyzed by traces of most elements of the first transition series of the periodic chart. Thus, propellants formulated with oxides of these metallic elements suffer hardening and embrittlement in storage and become unfit for use.

The most practical choice among the hitherto proposed metal oxide catalysts has been ferric oxide, either hydrous (FeOOH) as described in U.S. Pat. No. 4,424,085; Anchor FY-842 TM FeOOH (Toho Ganryo Dogyo Co., Ltd.); and Mapico Yellow 300 TM FeOOH (Cities Service Co., Columbian Division Citgo) or anhydrous ($Fe_2O_3$). A particularly small particle iron oxide is described in U.S. Pat. No. 4,006,090 entitled "Alpha Iron (III) Oxide Crystals and Derivatives" issued to Beck. The major limitation of ferric oxide is that the catalytic efficiency diminishes rapidly as its concentration is increased. Moreover, acceptable rheology of the uncured propellant and tensile properties after cure impose a strict upper limit on the allowable concentration of solid ingredients. Hence, ferric oxide, which provides a negligible contribution at impulse, must be added at the expense of ballistically valuable solid ingredients, typically ammonium perchlorate oxidizer or powdered aluminum fuel.

To circumvent the aforementioned solids loading limitation, it has been proposed to use liquid organoiron compounds (e.g., alkylferrocene derivatives) (see U.S. Pat. No. 4,120,709) as catalysts for increasing burning rate. These substances offer acceptable fuel value and may be substituted for a fraction of the organic binder. Thus, they may be used at relatively high concentration with relatively little degradation of rheology, tensile properties or delivered impulse. Unfortunately, these catalysts suffer several important limitations. They greatly depress the autoignition temperature of a propellant and thereby increase the hazard of accidental ignition by friction, impact, or any other source of heat. They also migrate readily from the propellant into inert organic substrates such as liners and insulators. Finally, they can impair aging stability at elevated temperature in air. In addition, they are relatively expensive.

Accordingly, there has been a constant search in this field of art for propellant catalysts having improved properties.

DISCLOSURE OF INVENTION

This invention is directed to a method for making a ferric oxide burning rate enhancing catalyst that results in a small particle size high surface area catalyst. The method comprises diluting a gaseous iron-containing compound with an oxygen-containing gas at a temperature such that the rate of oxidation is negligible and then oxidizing the diluted gaseous iron-containing compound in an oxygen-containing environment. Ferric oxide particles are formed, suspended in the oxygen-containing environment.

This process and catalyst make a significant advance in the field of burning rate catalysts for solid rocket motors. This process provides an ultra pure, highly active, finely divided burning rate catalyst.

The foregoing and other objects, features and advantages will be apparent from the specification, claims and from the accompanying drawings which will illustrate an embodiment of the invention.

BEST MODE FOR CARRYING OUT THE INVENTION

Figure 1:
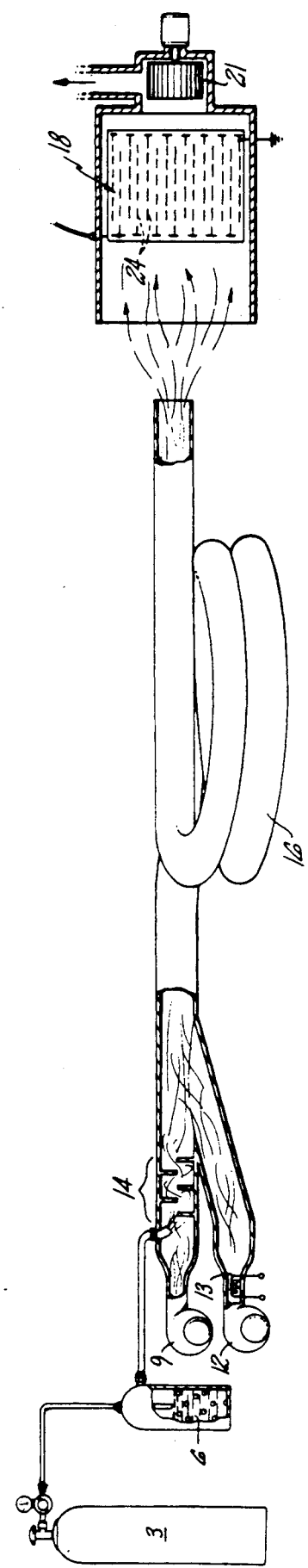
FIG. 1 schematically illustrates the method of making the iron oxide catalyst according to this invention.

Generally, any iron-containing compound that is capable of being vaporized without significant decomposition at a temperature below about 500° C. and is capable of reacting at temperatures below about 500° C. with an oxygen-containing atmosphere to form ferric oxide as the exclusive solid product (i.e., is susceptible to oxidation) may be used in this invention. It is important that the compound be capable of being vaporized without decomposition at a temperature below about 500° C. because the most finely divided (e.g., smallest particle size) product is obtained only if the iron atoms in the starting material are spatially widely separated. If they are closely associated, as in a condensed (i.e., solid or liquid) compound, the particles of the product of oxidation will contain many iron atoms (i.e., the iron oxide particles will be relatively large). It is important that the compound be capable of reacting at temperatures below about 500° C. with an oxygen-containing atmosphere to form ferric oxide as the exclusive solid product because unconverted starting material or solid products other than ferric oxide are likely to be inferior burning rate catalysts and to exert harmful effects on propellant properties other than burning rate (e.g., shortened pot life and impaired aging stability). At temperatures above 500° C. agglomeration and sintering of the oxidation product will occur with loss of specific surface area resulting in reduced catalytic activity.

It is also preferred that the iron-containing compound have a high iron content to increase the yield of the desired iron oxide product. Finally, it is preferred that the iron-containing compound be essentially free of any impurities that will not react to form harmless gases in the oxidation step. In particular, impurities containing metals other than iron are usually very undesirable.

It is especially preferred to employ compounds containing only the elements carbon, hydrogen, nitrogen and oxygen in addition to iron. The presence of halogens, sulfur, phosphorous and boron is undesirable because it interferes with the complete conversion to the oxide. In addition, phosphorous, boron and sulfur can form a glassy product or undesired solid residue that coats the iron oxide.

Preferred generic classes of iron-containing compounds are carbonyls, chelates of beta diketones, complex cyanides and ferrocene derivatives. These are preferred because they contain adequate concentrations of iron, exhibit the required volatility and thermal stability, and oxidize readily at elevated temperatures to form as a solid product only ferric oxide. Exemplary compounds include ferric acetylacetonate, ferrous ferrocyanide and ferrocenes (e.g., lower alkyl).

It is especially preferred that iron pentacarbonyl (available from Pressure Chemical Co., Pittsburgh, PA) be used because of its low cost, high volatility, low melting point, high iron content and stability in the dark at temperatures well above its boiling point. Finally, by virtue of its susceptibility to oxidation at low temperature, it produces a superior catalyst.

Typically, an inert carrier gas (e.g., nitrogen) is used to transfer the vapor of an iron-containing starting material such as iron pentacarbonyl to the site at which it is mixed with a cool oxidizing gas.

Oxidation of the iron compound requires an oxygen-containing gas (e.g., air). Preferably, it is essentially free of any impurities that will not be converted to form harmless gases in the oxidation step. Generally, the oxygen must be present in at least about 10% by volume in order to ensure complete and prompt oxidation.

The catalysts of this invention are made by an improved process over that disclosed in commonly assigned copending application entitled "Iron Oxide Catalyst and Method for Making Same" filed Apr. 30, 1987, Ser. No. 44,096, now U.S. Pat. No. 4,854,981, the disclosure of which is hereby incorporated by reference. For equivalent reaction conditions, especially iron-containing compound feed rate, this process will result in higher specific surface than the process described in the above-identified application.

The catalysts of this invention may be made by the vaporization of the above-described iron-containing compounds in an inert carrier gas. The gaseous mixture thereby produced is then diluted with cool, oxygen-containing gas in such proportions that the resulting mixture is homogeneously oxidizer-rich prior to heating. It is especially preferred that the oxidizer to fuel ratio be greater than about twice stoichiometric to increase dilution and to ensure complete oxidation. Thus, it is preferred that the resulting mixture be oxidizer-rich (fuel-lean) so that when the mixture is subsequently heated by hot air there be no fuel-rich regions whatsoever. Otherwise, there may be produced undesirable products of incomplete oxidation such as: carbonyl-containing species, iron carbide, and other carbonaceous species. For convenience and economy, it is preferred that the diluting gas be air.

The temperature of the diluting, oxygen-containing gas should be sufficiently low that the rate of oxidation of the iron-containing compound is negligible. It is especially preferred that the diluting gas be of such temperature that the diluted gaseous mixture has a temperature ranging from about 0° C. to about 65° C. because oxidation begins to occur above 65° C. and both condensation of iron-containing compound and energy demand become excessive below 0° C. In the case of iron pentacarbonyl feedstock, the preferred temperature is ambient (room) temperature.

It is believed that the diluting gas serves a two-fold purpose in producing desirable particles of iron oxide product. First, it minimizes the growth of the nascent particles of iron oxide by separating them and thereby reducing the frequency of collision leading to coalescence. Second, because it contains oxygen, it ensures that subsequent oxidation will occur in a homogeneously oxidizer-rich environment and thereby produce iron oxide free of carbonaceous contaminants.

The diluted gas stream is next mixed with another stream of oxygen-containing gas that has a temperature sufficient to raise the resulting final mixture to the desired reaction temperature. Preferably, the ratio of oxygen to iron-containing reagent in the final mixture is greater than four times stoichiometric. The iron compound is then completely oxidized at high dilution in the resulting oxygen-rich environment.

It is preferred that iron pentacarbonyl be oxidized at a temperature between 160° C. and 1370° C. Below about 160° C., the rate of reaction becomes impractically low. Above about 1370° C., the particle size of the product grows to undesirably high levels. It is especially preferred that iron pentacarbonyl be oxidized at a temperature between about 200° C. and 500° C. Below about 200° C., an impractically long residence time (hence reaction duct length) is required to obtain a satisfactory yield of product. Extended exposure to temperatures above about 500° C. should be avoided in order to limit growth and annealing of particles of product that reduce catalytic surface area. To free the oxidation product from volatile impurities adsorbed after recovery, it is usually desirable to heat the product in vacuum to a temperature of about 150° C. to vaporize adsorbed volatile impurities, especially moisture adsorbed from the atmosphere.

According to FIG. 1, for those iron-containing compounds that are liquids at the vaporization temperature, the inert carrier gas 3 may be bubbled through the iron-containing liquid 6 and the resultant vapor/carrier mixture combined with unheated air from a blower 9 in a dilution zone 14. The diluted gas stream is then mixed with air from blower 12 that is warmed by heating elements 13. The resultant mixture spontaneously oxidizes in reaction zone 16. The oxidation products are drawn through an electrostatic precipitator 18 by a squirrel cage blower 21. Suitable electrostatic precipitators are an Emerson Electronic Air Cleaner, Model 14C22M-41000 (available from White-Rodgers, Inc., Chicago, Illinois) and the one from Example 1. The resulting catalysts may then be collected by scraping or simply shaking the electrodes 24 of the precipitator.

Iron-containing compounds that are either liquid or solid at the vaporization temperature may be vaporized into the carrier gas by directing a stream of the latter over the surface of the solid compound and continuing as described above with oxidation, precipitation and collection. It is preferable that the vapor pressure of the iron-containing starting material be greater than about 0.005 atmospheres. This enables the collection of adequate quantities of catalyst. It is especially preferred that the vapor pressure be greater than about 0.01 atmospheres to provide a conveniently high rate of production of catalyst. These vapor pressures can be achieved by raising the temperature of the vaporizing compound.

Figure 2:
FIG. 2 is a transmission electron micrograph (300,000×) of the ferric oxide particles of this invention.

The product of these processes is very finely divided, highly catalytically active, anhydrous iron oxide. A number of characteristics are believed to contribute to its high activity. The most important is its enormous surface area provided by average particle diameters that are less than about 100Å (10 nanometers (nm)) and even 50Å (5 nm). They typically have globular shapes that provide improved processibility. Generally, the average calculated specific surface area is greater than about 250 $m^2/g$. FIG. 2 depicts a transmission electron micrograph of the ferric oxide catalyst of this invention. In the figure, the particles are less than about 50Å (5 nm) in size having an average particle size of 30Å (3 nm) and an average specific surface area of 275 $m^2/gm$.

Figure 3:
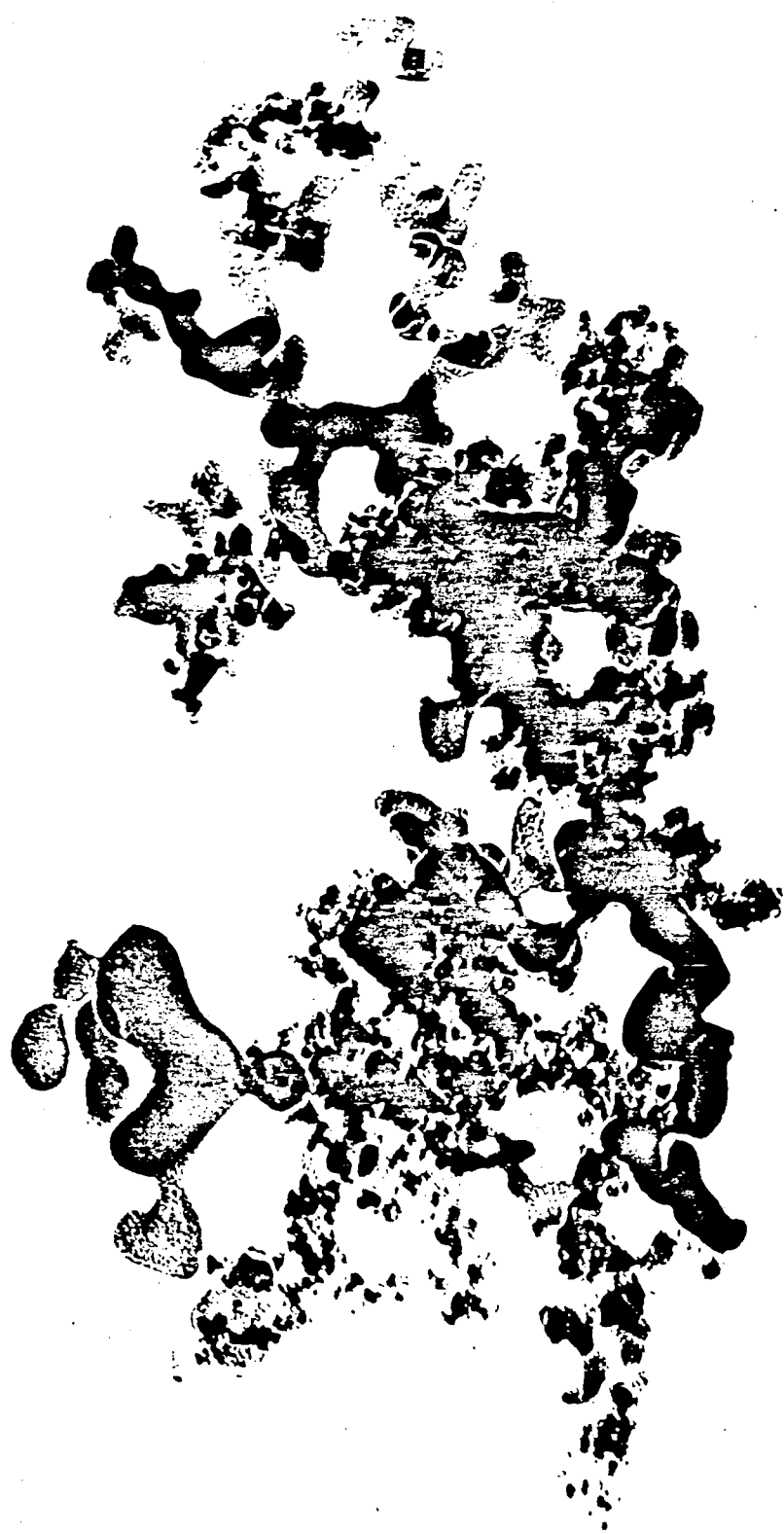
FIGS. 3-5 are transmission electron micrographs (300,000×) of other ferric oxide catalysts: Sicotrans Red L2715D TM pigment (BASF), Sicotrans Red NB-L2817 TM pigment (BASF) and a Carbonyl Iron Oxide Red pigment (BASF), respectively.
Figure 4:
Figure 5:

FIG. 3 depicts a (TEM) of Sicotrans Red L2715D ™ iron oxide pigment available from BASF. It has a visibly larger particle size than the iron oxide of this invention and an average surface area of about 85 $m^2/gm$. FIG. 4 depicts a (TEM) of Sicotrans Red NB-L2187 ™ iron oxide pigment available from BASF. It has a visibly larger particle size than the iron oxide of this invention and an average surface area of about 100 $m^2/gm$. The above three iron oxide catalysts are also compared for rocket propellant activity in Table II and FIG. 6. FIG. 5 depicts a (TEM) of Carbonyl Iron Oxide Red that was obtained from BASF. It is believed that this is made by the combustion of iron carbonyl. It has a visibly much larger particle size than the iron oxide of this invention and an average surface area of only 11 $m^2/gm$.

Table I details specific surface area in meters squared per gram ($m^2/g$) for several batches A-F of iron oxide made according to the process (Direct Oxidation) detailed in copending application Ser. No. 44,096 entitled "Iron Oxide Catalyst and Method for Making the Same". It also details the average specific surface area in $m^2/g$ for those batches. The Table compares those values to the specific surface area for a sample G made according to this invention (Gas Dilution). The method of this invention can provide a surface area increase of about one third. The increase in surface area relates to increased catalytic activity.

TABLE I

| Specific Surface Area of Iron Oxide | | |
|---|---|---|
| Experiment | Method | Specific Surface Area - $m^2/g$ |
| A | Direct Oxidation | 274 |
| B | Direct Oxidation | 258 |
| C | Direct Oxidation | 275 |
| D | Direct Oxidation | 274 |
| E | Direct Oxidation | 270 |
| F | Direct Oxidation | 264 |
| Avg. A-F | Direct Oxidation | 269 |
| G | Gas Dilution | 355 |

A second characteristic of the catalysts of this invention is the chemical composition of the novel catalyst, substantially pure ferric oxide. It is chemically stable at flame temperatures and therefore is believed to be the form responsible for catalysis of combustion. It is believed that other forms of iron or iron oxide (for example, hydrated ferric oxide, FeOOH) must be converted to anhydrous ferric oxide before they become active. This delays catalysis and thereby diminishes catalytic efficiency. In the case of certain iron-containing catalysts, including hydrated ferric oxide, FeOOH, the yield of active ferric oxide in the flame is less than the amount of precursor added to the propellant formulation.

Third, the surface microstructure of the novel catalyst is believed to be especially active. The active sites on solid, inorganic oxidation catalysts are believed to be characterized by defects in the crystal lattice that promote the desired adsorption of reagents and desorption of products in the catalyzed process. The catalyst of this invention is believed to possess at the outset an active surface microstructure that must be acquired in a flame of burning propellant by other catalysts.

Finally, the novel catalyst is free of the undesirable impurities (e.g., halides and sulfates) that are typically adsorbed upon iron oxides that are conventionally prepared in aqueous solution inherently containing high concentrations of foreign ions. Such impurities are often responsible for acceleration of cure (short pot life of uncured propellant) and for accelerated oxidative degradation of olefinically unsaturated binders (e.g., polybutadiene). In contrast, this process eliminates the solutions and thus the impurities.

Typically, the above catalysts are used as a burning rate accelerator for an ammonium perchlorate based rocket propellant. However, it is also believed that the burning rates of propellants based on other perchlorates (e.g., potassium perchlorate) would be enhanced by the use of the above catalyst. Typically, a variety of other conventional components and additives are compounded (added) in conventional amounts to facilitate use as a rocket propellant. An exemplary list of additives include fuel binders, curing agents, plasticizers, adhesion-increasing agents (i.e., bonding agents) antioxidants, powdered metal fuels, and combustion stabilizers.

EXAMPLE

A stream of nitrogen gas was passed at a rate of 18 liters per minute for 420 minutes through a gas-washing bottle fitted with a dip tube that ended immediately above the surface of 562.4 grams of liquid iron pentacarbonyl at room temperature. The resulting mixture of nitrogen gas and iron carbonyl vapor was injected tangentially into a 7.5 centimeter diameter, 24-inch long dilution duct, which was closed at the injection end and which discharged at a right angle into a second, reaction duct described below. A stream of 35 liters per minute of compressed air at room temperature was also injected tangentially into the dilution duct at a point diametrically opposite the injection point of the nitrogen gas/iron pentacarbonyl vapor stream. The resulting gas mixture (oxidizer:fuel ratio=approximately 14 times stoichiometric) discharged into a stream of air in the second duct that had been heated to approximately 390° C. Corrected to room temperature, the rate of flow of the heated air was approximately equal to the total flow of gas from the premixing duct, i.e., 53 liters per minute. As the premixed feed gas stream was heated by admixture with the hot air stream in the second duct, oxidation of the iron pentacarbonyl vapor occurred spontaneously. The total gas mixture proceeded through a coiled, insulated, 3-meter length of 7.5-cm diameter stainless steel ducting. From there the reaction products and carrier gases discharged into the intake of an electrostatic precipitator (Model EPP-1200X2, available from Aercology, Inc., Old Saybrook, Connecticut). The oxidation process was allowed to occur for 420 minutes, at which time the charge of iron pentacarbonyl in the evaporator was depleted. The flow of nitrogen carrier gas was then stopped, the electrical power to the precipitator was turned off, and the iron oxide product (109 grams with specific surface area of 274 m²/g) was removed from the precipitator plates by shaking. It should be noted that for equivalent reaction conditions, the process contained U.S. application Ser. No. 44,096 would result in a product of lower specific surface area.

Four ammonium perchlorate based propellants were similarly compounded. However, three contained 1.0 wt % ferric oxide (labeled B, C, D). The above four propellants were static tested at various pressures in small rocket motors. The results of the motor tests are depicted in FIG. 6 and in Table II.

Figure 6:
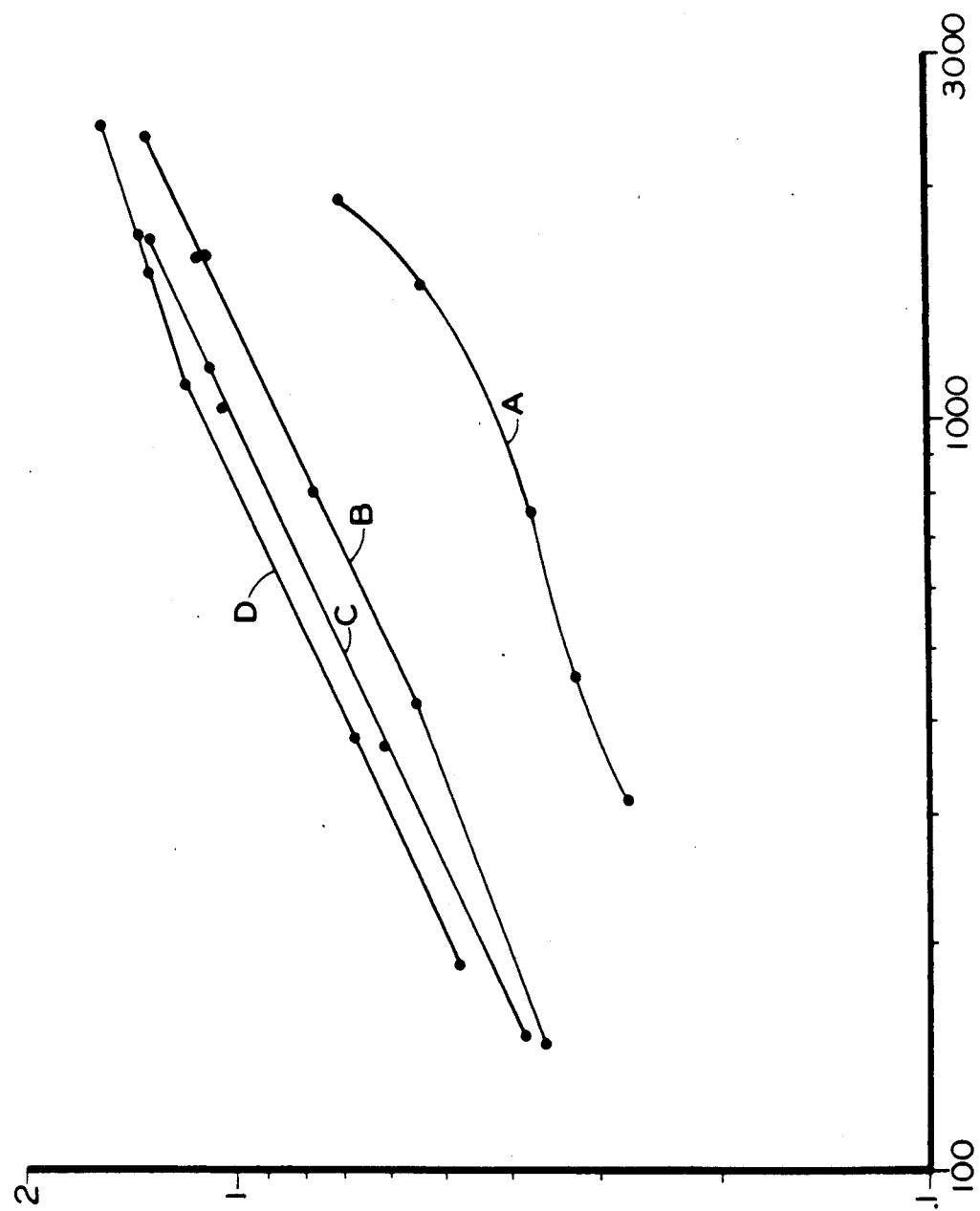
FIG. 6 graphically depicts the relation of burning rate to pressure for a control propellant, a propellant that contains the catalyst of this invention and propellants that contain other ferric oxide catalysts.

FIG. 6 and Table II illustrate that the iron oxide catalyst of the present invention is substantially more effective than Sicotrans Red L2715 TM pigment (C) or Sicotrans Red NB-L2817 TM pigment (B) in elevating the burning rate of the control formulation (A). The burn rate in inches per second (in./second) is graphed against pressure in pounds per square inch (psi). The catalyst of this invention provides not only a high burning rate but also a desirably low pressure exponent. The pressure exponent, n, is defined by the burning rate expression $$r = a + bP^n$$

where
r is the burning rate,
a and b are constants,
P is pressure and
n is the pressure exponent.

TABLE II

| Comparison of Iron Oxide Burning Rate Catalysts | | | | |
|---|---|---|---|---|
| Catalyst | D | C | B | A |
| Percent | 1.00 | 1.00 | 1.00 | 0 |
| Size, μm | ≈0.003 | irregular | ≈0.01 × 0.1 | |
| m²/gm | 275 | 85 | 106 | |
| BURN RATE SUMMARY | | | | |
| in. per sec. at | 1.06 | 0.99 | 0.87 | 0.46 |

TABLE II-continued

| Comparison of Iron Oxide Burning Rate Catalysts | | | | |
|---|---|---|---|---|
| 1000 psi pressure exponent | 0.44 | 0.50 | 0.50 | 0.53 |
| MOTOR TESTS | | | | |
| Pressure psi | Burn Rate in./sec | Burn Rate in./sec | Burn Rate in./sec | Burn Rate in./sec |
| 190 | 0.48 | | | |
| 380 | 0.67 | | | |
| 1110 | 1.17 | | | |
| 1565 | 1.30 | | | |
| 1755 | 1.35 | | | |
| 2430 | 1.52 | | | |
| 155 | | 0.38 | | |
| 370 | | 0.60 | | |
| 1035 | | 1.03 | | |
| 1180 | | 1.07 | | |
| 1745 | | 1.30 | | |
| 150 | | | 0.36 | |
| 425 | | | 0.55 | |
| 805 | | | 0.77 | |
| 1640 | | | 1.14 | |
| 1655 | | | 1.10 | |
| 2360 | | | 1.33 | |
| 315 | | | | 0.27 |
| 460 | | | | 0.32 |
| 755 | | | | 0.37 |
| 1500 | | | | 0.53 |
| 1975 | | | | 0.70 |

Although this invention has been described in terms of the production of a ferric oxide catalyst for use in rocket propellants, the ferric oxide may also be used advantageously in other gas-phase oxidation processes requiring a solid, refractory catalyst of high surface area.

This invention provides a convenient process for producing a rocket propellant burning rate catalyst that has excellent catalytic activity. Specifically, the process results in a very finely divided ferric oxide that produces a high burning rate and a low pressure exponent.

It should be understood that the invention is not limited to the particular embodiment shown and described herein, but that various changes and modifications may be made without departing from the spirit or scope of this concept as defined by the following claims.

We claim
1. A method for making ferric oxide particles comprising:
   a. diluting a gaseous iron-containing compound with an oxygen-containing gas at a temperature such that the rate of oxidation is negligible, said iron-containing compound
      (i) capable of being vaporized below about 500° C.; and
      (ii) capable of forming ferric oxide when reacted with oxygen-containing atmosphere at temperatures below about 500° C.; and
   b. oxidizing said diluted gaseous iron-containing compound in an oxygen-containing environment wherein ferric oxide particles are formed, suspended in the oxygen-containing environment.

2. The method as recited in claim 1 wherein the iron containing compound is an iron carbonyl.

3. The method of claim 2 wherein the iron carbonyl is iron pentacarbonyl.

4. The method as recited in claim 1 wherein the iron-containing gas is diluted with an oxygen-containing gas so that the ratio of oxygen to the iron-containing compound is greater than stoichiometric.

5. The method as recited in claim 1 wherein said iron containing compound is oxidized at temperature between about 157° C. and about 1371° C.

6. The method as recited in claim 1 wherein said iron containing compound is oxidized at a temperature between about 204° C. and 500° C.

7. The method as recited in claim 1 wherein the dilution is conducted at a temperature below about 66° C.

8. A method for making a ferric oxide burning rate enhancing catalyst particularly adapted for use in a solid rocket propellant comprising:
 (a) diluting a gaseous iron-containing compound with an oxygen-containing gas at a temperature such that the rate of oxidation is negligible, said iron-containing compound
  (i) capable of being vaporized below about 500° C.; and
  (ii) capable of forming ferric oxide when reacted with an oxygen-containing atmosphere at temperatures below about 500° C.; and
 (b) oxidizing said diluted gaseous iron-containing compound in an oxygen-containing environment wherein ferric oxide particles are formed, suspended in the oxygen-containing environment.

9. The method as recited in claim 8 wherein the iron-containing compound comprises carbonyls, chelates of beta diketones, complex cyanides and ferrocene derivatives.

10. The method as recited in claim 8 wherein the iron-containing compound is iron pentacarbonyl.

11. The method as recited in claim 8 wherein the iron-containing gas is diluted with an oxygen-containing gas so that the ratio of oxygen to is above stoichiometric.

12. The method as recited in claim 10 wherein said iron pentacarbonyl is oxidized at a temperature between about 157° C. and about 1371° C.

13. The method as recited in claim 10 wherein said iron pentacarbonyl is oxidized at a temperature between about 204° C and 500° C.

14. The method as recited in claim 8 wherein the dilution is conducted at a temperature below about 66° C.

* * * * *